United States Patent
Konopacki et al.

(10) Patent No.: US 10,354,371 B2
(45) Date of Patent: Jul. 16, 2019

(54) SYSTEM, METHOD AND APPARATUS FOR LOCATING THE POSITION OF A COMPONENT FOR USE IN A MANUFACTURING OPERATION

(71) Applicant: GENERAL ELECTRIC TECHNOLOGY GMBH, Baden (CH)

(72) Inventors: Ronald Francis Konopacki, Suffield, CT (US); Allan Gunn Ferry, Windsor, CT (US); Matthew David Allen, Enfield, CT (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 15/286,910

(22) Filed: Oct. 6, 2016

(65) Prior Publication Data
US 2018/0101943 A1    Apr. 12, 2018

(51) Int. Cl.
  G06T 7/60    (2017.01)
  G06K 9/62    (2006.01)
  (Continued)

(52) U.S. Cl.
  CPC ............ G06T 7/0004 (2013.01); G01B 11/12 (2013.01); G05B 19/402 (2013.01); G06K 9/52 (2013.01);
  (Continued)

(58) Field of Classification Search
  CPC ....... G01B 11/12; G06T 7/0004; G06T 7/004; G06T 7/60
  See application file for complete search history.

(56) References Cited

U.S. PATENT DOCUMENTS 4,099,418 A    7/1978 Bennett et al.
7,668,617 B2   2/2010 Vassard et al.
(Continued)

FOREIGN PATENT DOCUMENTS

CN    103925878 A    7/2014
FR    2 860 888 A1   4/2005
WO    2016/133924 A1 8/2016

OTHER PUBLICATIONS

International Search Report and Written Opinion issued in connection with corresponding PCT Application No. PCT/EP2017/074838 dated Dec. 15, 2017.
(Continued)

Primary Examiner — Obafemi O Sosanya
(74) Attorney, Agent, or Firm — Frank A. Landgraff

(57) ABSTRACT

A system for locating the position of a component includes, an image capture device, the image capture device being configured to capture an image of a component, a working implement mounted in fixed relation to the image capture device, a positioning system configured to adjust a position of the image capture device and the working implement in relation to the component, and an image processing module in communication with the image capture device, the imaging processing module being configured to receive the image from the image capture device and to identify at least one feature of the component. The positioning system is configured to adjust the position of the image capture device based on a location of the identified feature within the image to align the image capture device with the identified feature, and to align the working implement with the identified feature based upon an offset between the image capture device and the working implement.

19 Claims, 3 Drawing Sheets

(51) Int. Cl.
  *G06K 9/52* (2006.01)
  *G06T 7/00* (2017.01)
  *G01B 11/12* (2006.01)
  *G05B 19/402* (2006.01)
  *G06T 7/30* (2017.01)
  *G06T 7/70* (2017.01)

(52) U.S. Cl.
  CPC ............. *G06K 9/6267* (2013.01); *G06T 7/30* (2017.01); *G06T 7/60* (2013.01); *G06T 7/70* (2017.01); *G05B 2219/37608* (2013.01); *G05B 2219/49113* (2013.01); *G06T 2207/30164* (2013.01)

(56) References Cited

U.S. PATENT DOCUMENTS

| | | | | |
|---|---|---|---|---|
| 8,004,664 | B2* | 8/2011 | Etter | B23B 25/06 356/139.01 |
| 2005/0213082 | A1* | 9/2005 | DiBernardo | G01S 5/163 356/139.03 |
| 2008/0127501 | A1* | 6/2008 | Eaton | G01B 21/047 33/503 |
| 2012/0080523 | A1* | 4/2012 | D'urso | A61F 9/08 235/404 |
| 2014/0100694 | A1* | 4/2014 | Rueckl | B25J 9/1692 700/254 |
| 2015/0073584 | A1 | 3/2015 | Goodale et al. | |

OTHER PUBLICATIONS

Konopacki, R.F. et al., System and method for additively manufacturing boiler tubes, GE co-pending U.S. Appl. No. 15/331,046, filed Oct. 21, 2016.

Konopacki, R.F. et al., System, method and apparatus for preserving and capping tubes, GE co-pending U.S. Appl. No. 15/331,017, filed Oct. 21, 2016.

Konopacki, R.F., System, method and apparatus for manufacturing boiler tubes, GE co-pending U.S. Appl. No. 15/335,867, filed Oct. 27, 2016.

\* cited by examiner

SYSTEM, METHOD AND APPARATUS FOR LOCATING THE POSITION OF A COMPONENT FOR USE IN A MANUFACTURING OPERATION

BACKGROUND

Technical Field

Embodiments of the invention relate generally to the manufacture of components for power generation systems and, more particularly, to a system, method and apparatus for precisely locating the position of a component, such as a boiler tube, during a manufacturing process.

Discussion of Art

High pressure heat exchangers are manufactured with many miles of tubing purchased in standard lengths that are subsequently welded end to end form long tubes. During the manufacturing process, both ends of each tube are first machined in preparation for welding or other operations, which requires the position and center of each tube to be rather precisely located. Traditional mechanical probes used to locate parts operate in three axes, X, Y and Z. Rounded tube surfaces, irregular contours from manufacturing irregularities, uneven weld shrinkage during manufacturing and the large aperture in the center of each tube, however, make it difficult for such existing mechanical probes to reliably determine the tube position and locate the true center of the tube.

In connection with the above, traditional mechanical probes have several difficulties in correctly identifying the center of each tube with enough precision to properly machine the ends of the tube or tube perform other processing steps. In particular, moving a position probe in X and Y directions across a round tube end, combined with surface irregularities in the tubes, makes it difficult to consistently detect the outside diameter of the tube and then determine the true location of the tube center. Probing the inside diameter of the tube has similar issues, which can be magnified if the extruded throughbore in the tube is off center. Moreover, tubes, pipes, headers and drums may not be perfectly round, which introduces additional errors into the center-locating process. In addition, tubes grouped close together, such as waterwall tubes or header nipples, for example, also provide obstacles to the use of probes by impeding the probe motion around the tube of interest or potentially damaging the probe by unwanted physical contact. Waterwall panels present additional challenges because of the fin bars that are welded between adjacent tubes, which cover a portion of the outside surface of each tube and make the detection of the tube location from its outside surface more challenging and less accurate. Many existing machine processes still rely on a human operator to find or at least confirm that the machining tools are correctly aligned with the center of the tube, pipe, header, drum or other hollow conduit being manufactured, which is tedious, costly and often still imprecise.

In view of the above, there is a need for a system, method and apparatus for precisely locating the position of a component, such as a boiler tube, during a manufacturing process.

BRIEF DESCRIPTION

In an embodiment, a system for locating the position of a component is provided. The system includes, an image capture device, the image capture device being configured to capture an image of a component, a working implement mounted in fixed relation to the image capture device, a positioning system configured to adjust a position of the image capture device and the working implement in relation to the component, and an image processing module in communication with the image capture device, the imaging processing module being configured to receive the image from the image capture device and to identify at least one feature of the component. The positioning system is configured to adjust the position of the image capture device based on a location of the identified feature within the image to align the image capture device with the identified feature, and to align the working implement with the identified feature based upon an offset between the image capture device and the working implement.

In another embodiment, a method for aligning a working implement with a component is provided. The method includes the steps of positioning a component within a field of view of an image capture device, acquiring an image of the component with the image capture device, detecting at least one feature within the image, moving a working implement into alignment with the at least one feature, and performing a manufacturing operation on the component with the working implement.

In yet another embodiment, a method for locating the center of a component for use in a manufacturing operation is provided. The method includes the steps of positioning a tubular component within a field of view of a camera, centering an axial end of the tubular component in the field of view so that the axis of the camera is aligned with a tube axis, and moving a working implement according to a predetermined offset between the camera axis and an axis of the working implement to align the axis of the working implement with the tube axis, wherein the steps are performed autonomously without contacting the tube.

DRAWINGS

The present invention will be better understood from reading the following description of non-limiting embodiments, with reference to the attached drawings, wherein below:

DETAILED DESCRIPTION

Figure 1:
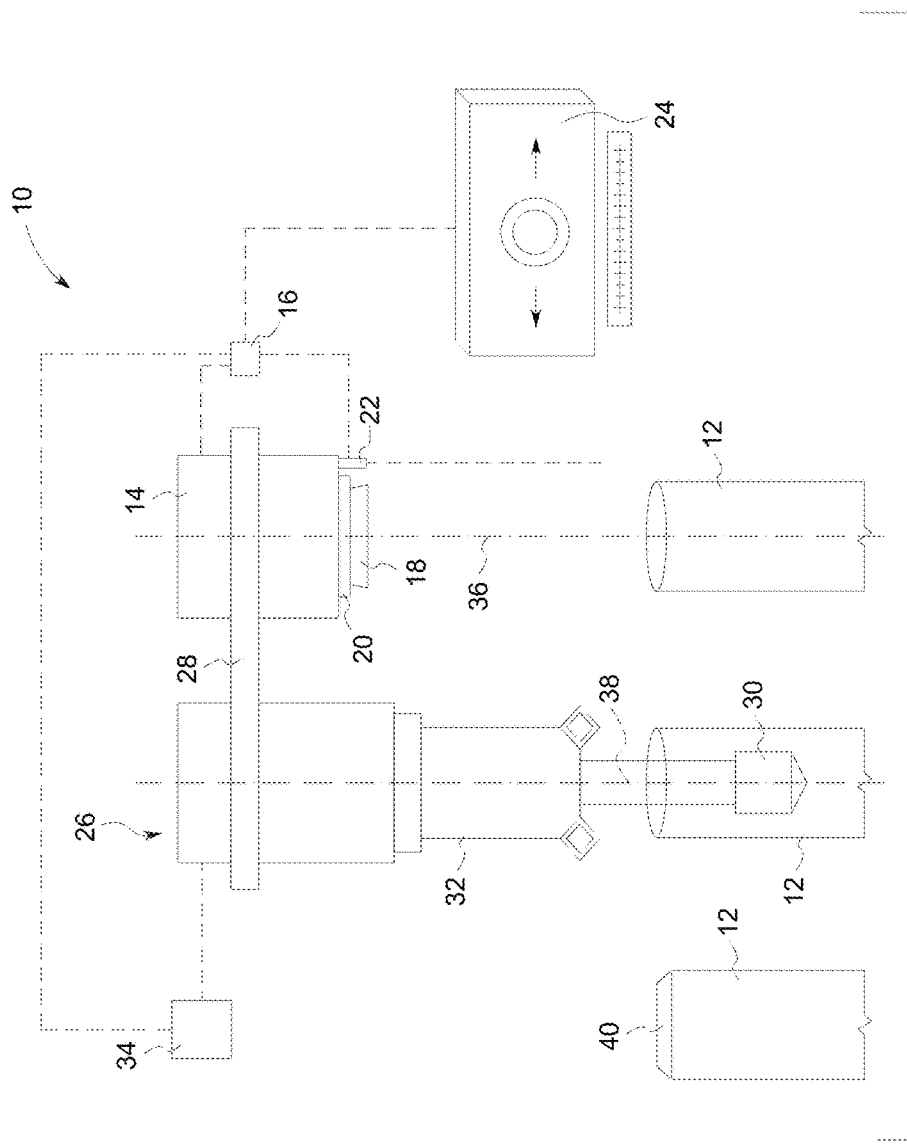
FIG. 1 is a schematic illustration of an automated component locating and centering system, according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in connection with the manufacture of long tubes for boilers, embodiments of the invention may also be utilized for determining the position and center of any tubular components such as pipes, conduits, drums and the like. In yet other embodiments, the invention may be utilized for determining the position of any component or structure, more generally.

As used herein, "operatively coupled" refers to a connection, which may be direct or indirect. The connection is not necessarily a mechanical attachment. As used herein, "fluidly coupled" or "fluid communication" refers to an arrangement of two or more features such that the features are connected in such a way as to permit the flow of fluid between the features and permits fluid transfer.

Embodiments of the invention relate to a system, method and apparatus for locating the position of a component, such as a boiler tube. The system includes a digital camera, an image processing unit, and a distance finder to precisely determine the inside and outside diameter of the tube, position of the tube in two dimensions, and the distance from a machining head. The system is configured to first align the camera with the center of the tube, and to then align a machining head with the center of the tube based upon known offsets between the camera and the machining head so that a manufacturing operation may be performed on the end of the tube.

Referring to FIG. 1, a system 10 for locating the position of a component and, more particularly, the center of a tubular component such as a tube 12, for use in subsequent manufacturing operations, is illustrated. The system 10 includes an image capture device 14, such as a digital camera, electrically or otherwise in communication with an image processing module or control unit 16 configured to run imaging processing software. As shown therein, the image capture device 14 includes an integrated lens 18 that is suitable for use in machining environments and is able to withstand impact and incursion from metal shavings, coolant spray, vibrations, etc. The image capture device 14 may also including a lighting mechanism, such as an LED ring 20 encircling or arranged around the lens 18 for illuminating the environment in front of the lens 18. While a LED ring 20 is depicted, other illuminating devices and mechanisms may also be utilized without departing from the broader aspects of the invention. For example, other lighting systems or devices may be configured based on the characteristics of the component being tooled and environmental conditions affecting the image acquired by the image capture device 14. The image capture device 14 is configured to capture an image of a portion of a component, such as the axial end of a tube 12, and to transmit the image to the processing module 16 for feature recognition, as discussed in detail hereinafter.

As further shown in FIG. 1, the system also includes a proximity detection device 22 electrically connected or otherwise in communication with the imaging processing module 16. In an embodiment, the proximity detection device 22 may be a laser or sonar device configured to determine the distance between the image capture device 14 and the component 12. As illustrated in FIG. 1, the proximity detection device 22 is separate from the image capture device 14, however, it is contemplated that the proximity detection device 14 may be integrated with the image capture device 14.

In connection with the above, the image capture device 14 is configured to capture an image of the component, or portion of the component, arranged in front of the lens 18, which in FIG. 1 is the axial end of a boiler tube 12. The captured image is then transmitted to the image processing module 16 for processing according to software and/or algorithms stored in memory. In particular, the image processing module 16 is configured to use one or more image processing techniques, such as those known in the art, to identify edges or features of the object in the image. In an embodiment, the image processing module 16 is configured to find circular shapes, and to determine the center of the circles, although the module 16 and/or software may be configured or programmed to find shapes or features of any configuration, such as rectangular, triangular, freeform and the like, and to determine a center or other location in relation to such shape or feature.

The image processing module 16 also receives, from the proximity detection device 22, distance information indicating the distance between the image capture device 14 and the open end of the tube 12. The identification of two-dimensional features such the circles defined by the outer and inner surface of the tube (in X-Y direction), and the determination of the distance from the end of the tube (in Z-direction) provides three-dimensional positional information regarding the location of the tube 12 and, more particularly, the center of the tube 12. As used herein, the location of the edges of the tube 12, as well as the center of the tube, is referred to herein as "positional data" or "location data." This positional data defines the size of the tube, as well as its distance from the image capture device 14. In an embodiment, where the distance from the image capture device 14 to the tube end is known by other means, this distance may be used in place of the measured distance.

Figure 2:
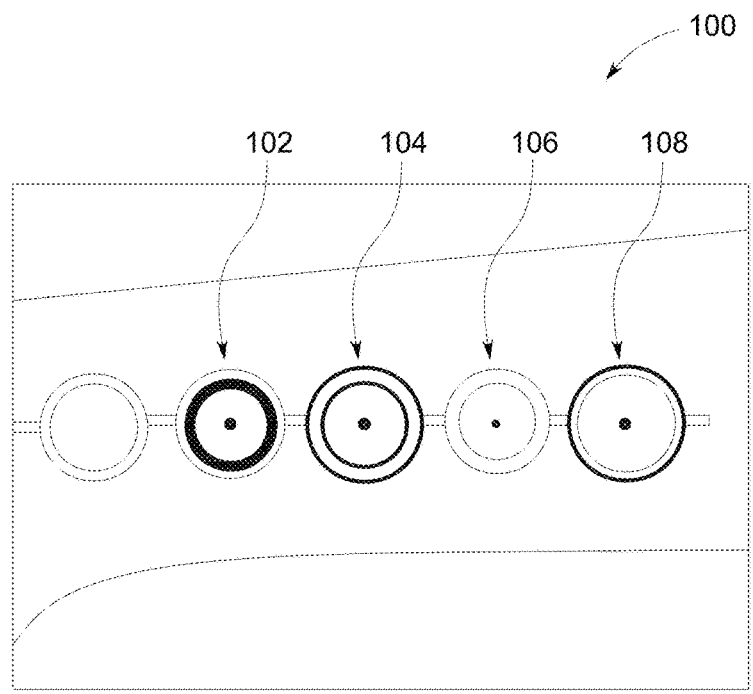
FIG. 2 is an exemplary depiction of an image captured by an image capture device of the system of FIG. 1.

FIG. 2 shows an exemplary image 100 captured by the image capture device 16, and circular features identified by the image processing module 16. As shown in FIG. 2, the imaging processing module 16 has identified a number of distinct circles in image 100 and has overlaid each such circle with a contrasting or colored circle (i.e., circle overlays 102, 104, 106, 108). In an embodiment, starker or clearer edges are displayed as brighter or thicker overlays.

Figure 3:
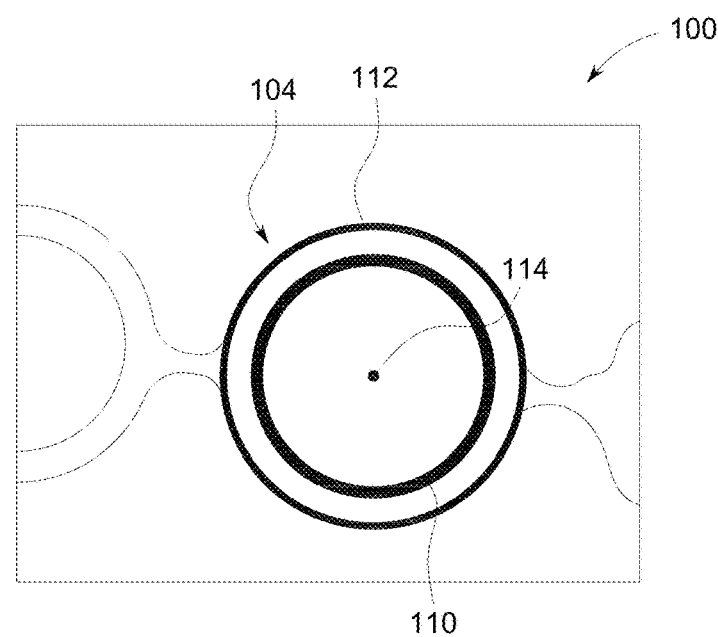
FIG. 3 is an enlarged view of the image of FIG. 2.

With reference to FIG. 3, an enlarged view of circle overlay 104 is shown. As can be seen in FIG. 3, the overlay 104 contains two concentric circle overlays 110, 112, corresponding to the inner and outer edges of the tube 12 (i.e., circle overlay 110 identifies the inner periphery of the tube 12, while circle overlay 112 identifies the outer periphery of the tube 12). The image processing module 16 is further configured to determine the center of the tube 12 after the circles defining the inner and outer surfaces of the tube 12 have been identified. As shown in FIG. 3, the image processing module 16 marks the precise center of the tube with a dot 114.

In an embodiment, the system 10 may include a display device 24 in communication with the image processing module 16 for displaying the images and overlaid circles (or other identified features) to a technician or operator. For example, the display device 24 may be used to display captured image 100.

In connection with the above, the image processing module 16 is configured to find circles within a captured image, determine which of these circles represent the inner and outer surfaces of the tube, and locate the centers of the inner and outer circles, for use in tool positioning, as discussed hereinafter. Looking at the end of a tube, the inner and outer surfaces are seen as circles, which are approximately concentric. The expected diameters may or may not be known. Finding the circles in the image begins with acquiring a video frame or snapshot from the image capture device 14. In an embodiment, the image is then filtered, which may include converting the image to greyscale and applying Gaussian or other filtering to reduce noise. Depending on lighting conditions for a given tooling environment, additional filtering may be applied. In an embodiment, a Hough circle transform (and, in particular, a gradient Hough circle transform) is then applied to the filtered image to detect circles within the image. The 'best' or primary circle is selected from the detected circles, based on criteria such as distance from the expected position of the tube, completeness, sharpness and ovality. As used herein, "ovality" means the degree of roundness of the circle. The best circle is assumed to represent either the inner or outer tube surface.

For situations in which both the inner and outer surfaces must be detected (depending on the specific subsequent manufacturing or machining step to be performed), the 'second best' or secondary circle is located, looking both inside and outside the primary circle to find one that is approximately concentric with it. This results in the identification of both the inside and outside surfaces of the tube 12. In an embodiment, the search criteria for identifying the secondary circle may be limited by defining the center of the circle as being within a small distance, radially, from the center of the primary circle. With knowledge of the expected range of tube wall thickness, the outer dimensions of the secondary circle can be limited to be smaller or larger than the diameter of the primary circle found by a distance slightly larger than the expected maximum wall thickness.

Finding both concentric circles with dimensions appropriate for the expected tube helps reduce errors in measurements based on the first circle found, determines the tube diameter for configuring a machining tool, and can be used to locate faults in the tube such as an off-center hole created during tube extrusion.

As indicated above, once the best circles are found (i.e., primary and secondary circles for a given tube, corresponding to the inner and outer (or outer and inner) surfaces of the tube), the center of the tube is calculated to determine the location of the center of the tube in the image.

In an embodiment, as shown in FIG. 1, the image capture device 14 may deployed on or integrated with a manufacturing machine 26 having a fixed mount 28 that has a known offset in three dimensions from a machining head 30. The machining head or working implement 30 may take the form of any machine tool known in the art, and may be mounted in a tool holder 32 of the manufacturing machine 26 or otherwise fixed to the manufacturing machine 26 by means known in the art. The manufacturing machine 26 and machining head 30 thereof may be integrated with a CNC or other automated control and positioning system 34 for controlling the position of the machining head 30, image capture device 14 and proximity detection device 22. The system 34 is in communication with the image processing module 16 and is configured to receive positional data for the tube 12, including the location of the tube edges and the tube center, as determined by the image processing module 16, as discussed above.

In an embodiment, a CNC interface is used for X-Y-Z positioning, for centering, and for tool deployment. Inputs from the CNC interface include X-Y-Z positioning inputs, to know the position, and to stay within specified limits. Outputs to the CNC interface include X-Y-Z positioning outputs, to first position the camera 20, and then the tool 30.

In an embodiment, the offset, generally, refers to known distance values, in three directions, between the image capture device 14 and the machining head 30 or specified point on the manufacturing machine 26 (such as the mount 28). The offset values are stored in memory of the control and positioning system 34 for use in a manufacturing operation, as discussed in detail hereinafter.

In another embodiment, the image capture device 14 and/or proximity detection device 22 may be deployed as a removable tool which mounts in the manufacturing machine using any standard tool interface, such as tool holder 32. In an embodiment, the image capture device 14 and the machining head 30 may be selectively mounted in the tool holder 32 and interchanged using an automatic tool changer. For example, in an embodiment, the image capture device may first be used to locate the center of a component using the process described herein. The image capture device may then be exchanged for a working implement, such as a machine tool, returning to the center location identified using the camera, and performing machining at that location, wherein the steps are performed autonomously. In an embodiment, the method may include the steps of picking up the camera from a tool rack, center the tube in the camera image, log the position in a database or memory, return the camera to the tool rack, pick up the machine tool from the rack, return to the remembered position (where the camera had been centered, and perform machining or other manufacturing operation using the machine tool.

In certain embodiments, such as where the image capture device 14 is configured for mounting in the tool holder 32 or other toll interface, wireless communication between the image processing module 16 and the control and positioning system 34 may be implemented. In an embodiment, a wireless base station may be attached to the control and positioning system, communicating with the image processing module 16 using any standard communication protocol such as 802.111x WiFi, Bluetooth or Zigbee. In yet other embodiment, a custom communication protocol may be substituted for the standard protocol.

In certain embodiments, such as, for example, where the image capture device 14 and/or proximity detection device 22 is configured as a removable tool, such devices may be powered by a rechargeable or disposable battery, so that operation of these devices is independent from the electrical power supplied to the manufacturing machine 26. In connection with the above, the image capture device 14 and/or proximity detection device may include a micro switch, hall effect device, capacitive sensor or similar detection technique to detect when the tool is mounted in the tool holder, and to ensure that it is only powered on when necessary.

The system 10 is operable in one of two modes. In a first mode, the location of the center of the tube 12 is first determined by the circle-finding method discussed above. The location of the center of the tube is then compared to the known center of the camera image field of view (i.e., the center of the captured image). The location of the center of the tube 12 relative to the center of the captured image is then communicated to the control and positioning system 34. The control and positioning system 34 then moves the image capture device 14 in the X and Y directions of offset from the tube center as needed, until the tube 12 is centered in the image field of view (i.e., the center of the detected circle(s) is positioned in the center of the camera image field of view). If the image capture device 14 is aligned parallel to the machining head 30 and perpendicular to the tool mount 28, this correctly centers the tube on the same axis 36 as the image capture device 14 (i.e., ensures axially alignment). In an embodiment, the system 10 is configured to perform this process autonomously to position the centerline of the image capture device 14 in line with the center of the tube 12.

In other embodiments, the display 24 may include a user interface through which a user may adjust the position of the image capture device 16 to center the image capture device with a tube 12. In connection with this, the display 24 may be a dynamic display that presents the camera view and displays arrows that indicate the direction of motion for centering the image capture device 14 or machining head 30. Another indicator, such as an asterisk or flashing border may signal successful centering of the image capture device 14, within a specified or predetermined tolerance.

Once the image capture device 14 is centered above the tube 12, the control and positioning system 34 may then automatically move the machining head 30 according to known offsets (i.e., a known offset between the image capture device 14 and the machining head 30) in order to center the machining head 30 in line with the centerline of the tube 12. That is, if there is an offset between the image capture device 14 and the machining head 30, as shown in FIG. 1, moving the machining head 30 according to the known offset will then properly align the machining head 30 with the end of the tube 12. This mode does not require a distance measurement to center the machine tool 30 over the tube (on the X and Y axes), but also does not determine the distance from the machine tool 30 to the tube (Z axis).

In a second mode, the center of the tube is located in the captured image using the circle-finding method described above, regardless of where in the image the tube is located. This mode requires a distance measurement from the image capture device to the tube end (using the proximity detection device 22) to determine the circle diameter, distance from the tool 30 in the Z axis, and distance offsets from the tool centerline 38 to the tube centerline 36 in the X and Y axes. From this information, the control and positioning system 34 can position the image capture device 14 over the tube center or calculate X, Y and Z offsets from the image.

In an embodiment, the image processing module 16 can communicate with the main CNC controls (e.g., the control and positioning system 34 in several different ways. Modern machine tools may be controlled b a Programmable Logic Controller which supports industry standard communications such as ModBus, ProfiBus, or Foundation Fieldbus, as well as vendor proprietary communication busses. The image processing module 16 may use a standard or vender proprietary communication bus to exchange information with the control and positioning system 34. Common communication networks such as TCP/IP over Ethernet or 802.11x WiFi wireless communications may also be used. Standard analog and digital signals may also be used to communicate between the image processing module 16 and machine controls 34. For example, two analog outputs from the image processing module 16 could describe the offset in X and Y directions between the central axis 36 of the image capture device 14. Digital outputs from the image processing module 16 could provide operability status, and indicate when the image capture device 14 is centered on the tube 12.

In an embodiment, the system 10, including at least the image processing module and circle-finding method, is PC-compatible. The runtime/deployment platform can be Android-based or on other computer systems, such as a tablet, embedded computer or personal computer.

It is contemplated that the system 10 may be utilized in connection with a variety of specific machining heads or working implements that are configured to perform a variety of specific manufacturing or machining operations. For example, FIG. 1 shows the working implement 30 in the form of weld preparation device that is used for header nipple weld preparation. The headers are made up of piping lengths and fittings which are welded together to form the assembly that are used to collect water or steam from a group of tubes in waterwall panels, elements such as economizer, superheater, reheater elements, or groups of individual tubes. The connections from the header body to such elements are tubes called nipples which are welded onto the header body with expansion loops to keep the tubes flexible in operation. This results in a variety of geometric shapes. Each nipple tube must be given a machined weld preparation on the end to connect with the element in the field. Prior to the invention described herein, the application of these weld preparations has been done manually at the manufacturing facility. Most commonly, either portable end preparation machines or radial drills have been used to make the end preparations. Indeed, prior to the invention described herein, CNC or similar machines have not been used to make these end preparations, as the exact location of the end of the tubes will vary greatly due to inaccuracies in the bending of the tubes and weld shrinkage.

In connection with the above, the working implement 30 may be any type of device configured to perform an operation on the end of the tube and other component, including, but not limited to, welding, polishing, heat treating, electrical discharge machining (EDM), caulking, cleaning and the like. Indeed, it is contemplated that the working implement need not be limited to machine tools, but broadly includes any device capable of performing a manufacturing operation on the tube. In other embodiments, the working implement 30 may be a camera or other visual inspection device (and in some embodiments, may be the image capture device itself) for performing a visual inspection of the component.

Heretofore, conventional machining probes and laser scanners are inefficient in finding the true circle or center for the round machined preparations, and each individual tube location must be found manually and the machining tool aligned with the tube. The system 10, however, is configured to automatically center the machining cutters (i.e., machining head 30) for weld preparation over each nipple tube 12, using the processes discussed above, and then cut a weld preparation 40 into the end of each nipple tube 12, as shown in FIG. 1. In particular, the image capture device 14 and image processing module 16 are used to locate the precise position of the top of the individual nipples on the header, and progressively locate the center of each tube. The system 10 then automatically positions the cutter for machining the weld preparation, under control of the control and positioning system 34.

Figure 4:
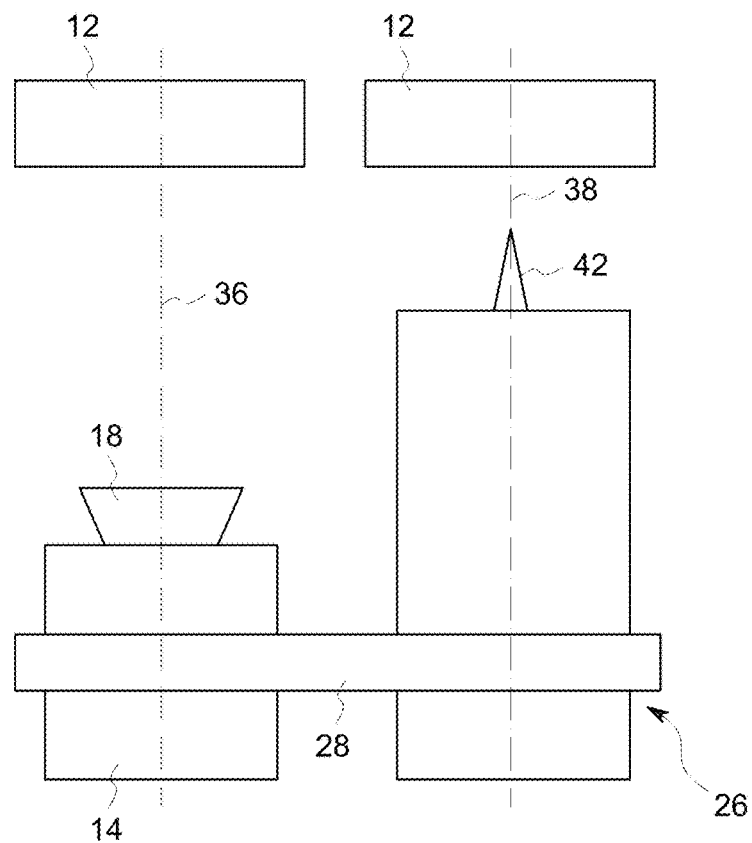
FIG. 4 is a schematic, top view of another implementation of the system of FIG. 1, according to an embodiment of the invention.
Figure 5:
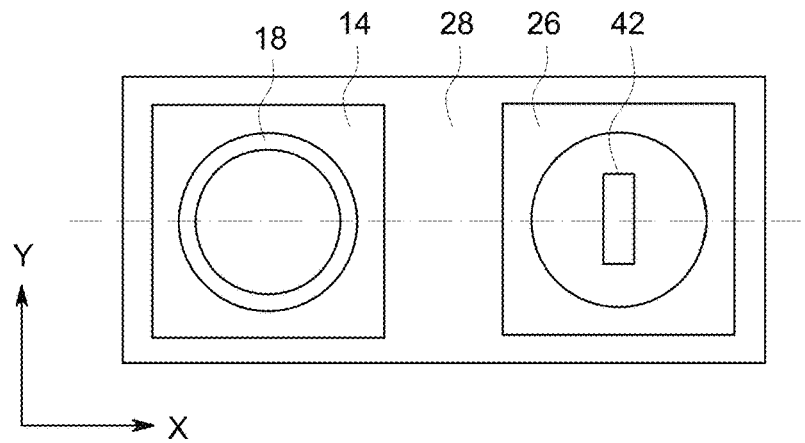
FIG. 5 is a schematic, front view of the system of FIG. 4.

With reference to FIGS. 4 and 5, in another embodiment, the manufacturing machine 26 may take the form of an endcap removal tool having an engagement member 42 that is configured to extend towards the tube 12, grab the end cap, retract from the tube with the endcap, and release the endcap. As indicated above, the system 10 is configured to first locate the center of the tube 12 using the image processing module 16, and then position endcap removal tube so that it is centered with the tube end so that the tool may be deployed. In particular, in an embodiment, the image capture device 14 and machining head or tool (in the form of an endcap popper 26) are mounted so that the two devices are aligned (e.g., along the X axis). The image capture device 14 and control and positioning system 34 may then be connected to a PC or other computing device. A tube may then be positioned in the field of view of the image capture device, perpendicular to the X-Y plane of the positioning system. A live camera view may be displayed on the display. Using the image capture device 14, the image processing module 16, and the control and positioning system 34, the image capture device 14 may be centered over the tube 12. Once the image capture device 14 has been centered, the endcap popper 26 can be aligned with the tube 12 by shifting the X-Y position of the popper 26 by known offsets (e.g., the distance between the image capture device 14 and tool centerline).

In yet other embodiments, it is contemplated that the system 10 can also be used for various other manufacturing processes which require centering of a manufacturing tool with a tube, including for tube waterwall scarfing (involving the centering of a camera, clamp, saw, plasma torch, and scarfing tool), endcap installation, and end facing of heavy walled components such as drums or headers.

As discussed above, the system 10 is therefore capable of accurately and consistently locating the tube ends for manufacturing operations. Accordingly, positioning errors that result in incorrect machining of components may be obviated or reduced. In addition, set up time may be significantly reduced as compared to manual positioning. Moreover, for densely packed tubes, there may not be space available for traditional mechanical, "touch" probes to fit in between the tubes. The system 10 of the invention, however, does not require any minimum spacing between the tubes to work properly. Image processing used by the system 10 is also faster than using a mechanical probe to physically contact multiple locations on a tube to determine its location.

In an embodiment, a system for locating the position of a component is provided. The system includes, an image capture device, the image capture device being configured to capture an image of a component, a working implement mounted in fixed relation to the image capture device, a positioning system configured to adjust a position of the image capture device and the working implement in relation to the component, and an image processing module in communication with the image capture device, the imaging processing module being configured to receive the image from the image capture device and to identify at least one feature of the component. The positioning system is configured to adjust the position of the image capture device based on a location of the identified feature within the image to align the image capture device with the identified feature, and to align the working implement with the identified feature based upon an offset between the image capture device and the working implement. In an embodiment, the image capture device is a digital camera. In an embodiment, the component is an axial end of a tube, and the at least one feature includes at least one of a circle defined by an outer surface or an inner surface of the tube. In an embodiment, the at least one feature includes a center of the circle. The positioning system is configured to adjust the position of the image capture device based on the location of the center of the circle in relation to the center of the image. In an embodiment, the system may also include a proximity detection device configured to determine a distance of the axial end of the tube from the image capture device, wherein the image processing module is configured to receive a distance measurement from the proximity detection device and to align the working implement with the center of the circle based on the distance measurement. In an embodiment, the positioning system is a CNC positioning system. In an embodiment, the working implement is one of a weld preparation device and an end-cap removal device. In an embodiment, the image processing module is configured to filter the image to produce a filtered image, identify a plurality of circles within the filtered image, and to select a primary circle of the plurality of circles based on set criteria. In an embodiment, the set criteria include at least one of a distance from an expected position of the tube, completeness of the circle, sharpness of the circle, and ovality of the circle.

In another embodiment, a method for aligning a working implement with a component is provided. The method includes the steps of positioning a component within a field of view of an image capture device, acquiring an image of the component with the image capture device, detecting at least one feature within the image, moving a working implement into alignment with the at least one feature, and performing a manufacturing operation on the component with the working implement. In an embodiment, the method may also include the step of centering the image capture device with the at least one feature prior to moving the working implement into alignment with the at least one feature. In an embodiment, the component may be an axial end of a tube, and the at least one feature may be a center of circle defined by at least one of an outer surface or an inner surface of the tube. In an embodiment, moving the working implement into alignment with the at least one feature includes moving the working implement based on a known offset between the image capture device and the working implement. In an embodiment, the known offset includes X, Y and Z directional components. In an embodiment, the method may also include the step of determining an axial distance between the image capture device and the axial end of the tube. In an embodiment, the method may also include the steps of removing the image capture device from a tool holder and placing the working implement in the tool holder. In an embodiment, the manufacturing operation includes at least one of machining a weld preparation on the axial end of the tube and removing an end cap from the axial end of the tube. In an embodiment, the step of detecting the center of the circle includes filtering the image to produce a filtered image and applying a Hough circle transform to the filtered image to detect a plurality of circles within the filtered image. In an embodiment, the step of filtering the image includes converting the image to greyscale and applying Gaussian filtering to reduce noise. In an embodiment, detecting the center of the circle includes selecting the circle from the plurality of circles based on a set of criteria including at least one of a distance of the circle from an expected position of the tube, completeness of the circle, sharpness of the circle, and ovality of the circle.

In yet another embodiment, a method for locating the center of a component for use in a manufacturing operation is provided. The method includes the steps of positioning a tubular component within a field of view of a camera, centering an axial end of the tubular component in the field of view so that the axis of the camera is aligned with a tube axis, and moving a working implement according to a predetermined offset between the camera axis and an axis of the working implement to align the axis of the working implement with the tube axis, wherein the steps are performed autonomously without contacting the tube.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system for locating the position of a component, comprising:
an image capture device, the image capture device being configured to capture an image of the component;
a working implement mounted in fixed relation to the image capture device;
a positioning system configured to adjust a position of the image capture device and the working implement in relation to the component;
an image processing module in communication with the image capture device, the imaging processing module being configured to receive the image of the component from the image capture device and to identify at least one feature of the component; and
a proximity detection device communicatively coupled with the imaging processing module configured to determine a distance measurement between the image capture device and the component when the proximity detection device is spaced from the component;
wherein the image processing module is configured to receive the distance measurement from the proximity detection device;
wherein the positioning system is configured to adjust the position of the image capture device relative to the component based on a location of the identified feature within the image and the distance measurement between the image capture device and the component, to align the image capture device with the identified feature; and
wherein the positioning system is configured to axially align the working implement with the identified feature based upon an offset between the image capture device and the working implement.

2. The system of claim 1, wherein:
the image capture device is a digital camera.

3. The system of claim 1, wherein:
the component is an axial end of a tube; and
the at least one feature includes at least one of a circle defined by an outer surface or an inner surface of the tube.

4. The system of claim 3, wherein:
the at least one feature includes a center of the circle; and
the positioning system is configured to adjust the position of the image capture device based on the location of the center of the circle in relation to the center of the image.

5. The system of claim 4, wherein:
the distance measurement is from the axial end of the tube to the image capture device when the proximity detection device is spaced from the axial end of the tube.

6. The system of claim 4, wherein:
the positioning system is a CNC positioning system.

7. The system of claim 4, wherein:
the working implement is one of a weld preparation device and an end-cap removal device.

8. The system of claim 4, wherein:
the image processing module is configured to filter the image to produce a filtered image, identify a plurality of circles within the filtered image, and to select a primary circle of the plurality of circles based on set criteria.

9. The system of claim 8, wherein:
the set criteria include at least one of a distance from an expected position of the tube, completeness of the circle, sharpness of the circle, and ovality of the circle.

10. A method for aligning a working implement with a component, comprising the steps of:
positioning a component within a field of view of an image capture device;
acquiring an image of the component with the image capture device;
detecting at least one feature within the image;
determining an axial distance between the image capture device and the component;
adjusting the position of the image capture device relative to the component based on a location of the identified feature within the image and the distance measurement between the image capture device and the component to align the image capture device with the identified feature;
moving a working implement into alignment with the at least one feature based upon an offset between the image capture device and the working implement; and
performing a manufacturing operation on the component with the working implement.

11. The method according to claim 10, further comprising the step of:
centering the image capture device with the at least one feature prior to moving the working implement into alignment with the at least one feature;
wherein the component is an axial end of a tube; and
wherein the at least one feature is a center of circle defined by at least one of an outer surface or an inner surface of the tube.

12. The method according to claim 11, wherein:
moving the working implement into alignment with the at least one feature includes moving the working implement based on a known offset between the image capture device and the working implement.

13. The method according to claim 11, wherein:
the known offset includes X, Y and Z directional components.

14. The method according to claim 11, wherein
the axial distance is between the image capture device and the axial end of the tube.

15. The method according to claim 11, further comprising the steps of:
removing the image capture device from a tool holder; and
placing the working implement in the tool holder.

16. The method according to claim 11, wherein:
the manufacturing operation includes at least one of machining a weld preparation on the axial end of the tube and removing an end cap from the axial end of the tube.

17. The method according to claim 11, wherein:
detecting the center of the circle includes filtering the image to produce a filtered image and applying a Hough circle transform to the filtered image to detect a plurality of circles within the filtered image.

18. The method according to claim 17, wherein:
the step of filtering the image includes converting the image to greyscale and applying Gaussian filtering to reduce noise.

19. The method according to claim 18, wherein:
detecting the center of the circle includes selecting the circle from the plurality of circles based on a set of criteria including at least one of a distance of the circle from an expected position of the tube, completeness of the circle, sharpness of the circle, and ovality of the circle.

\* \* \* \* \*